Nov. 24, 1925.
E. B. SMITH
1,563,235
PLANTER
Filed July 26, 1923     2 Sheets-Sheet 1
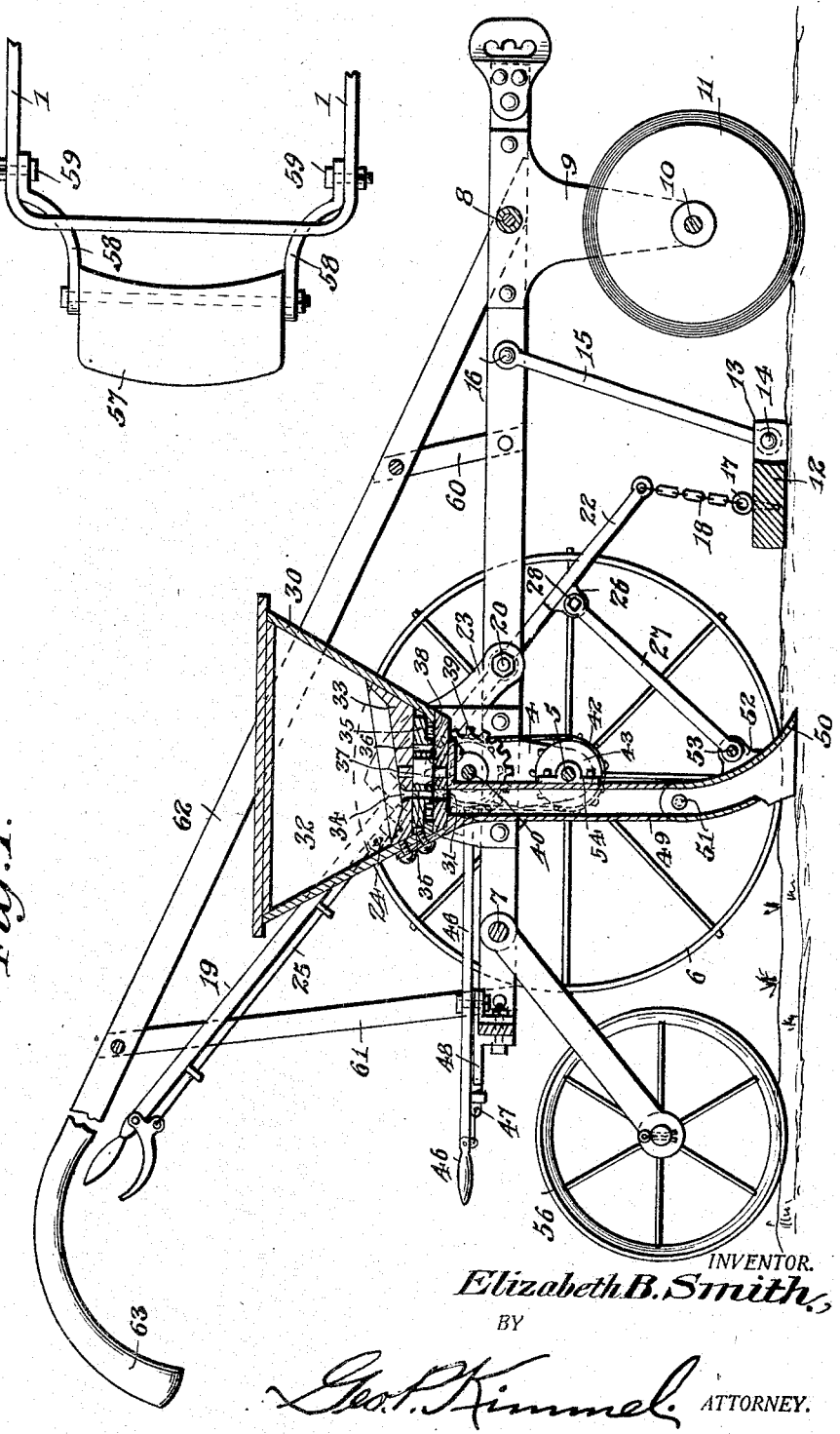
INVENTOR.
Elizabeth B. Smith,
BY
Geo. F. Kimmel, ATTORNEY.

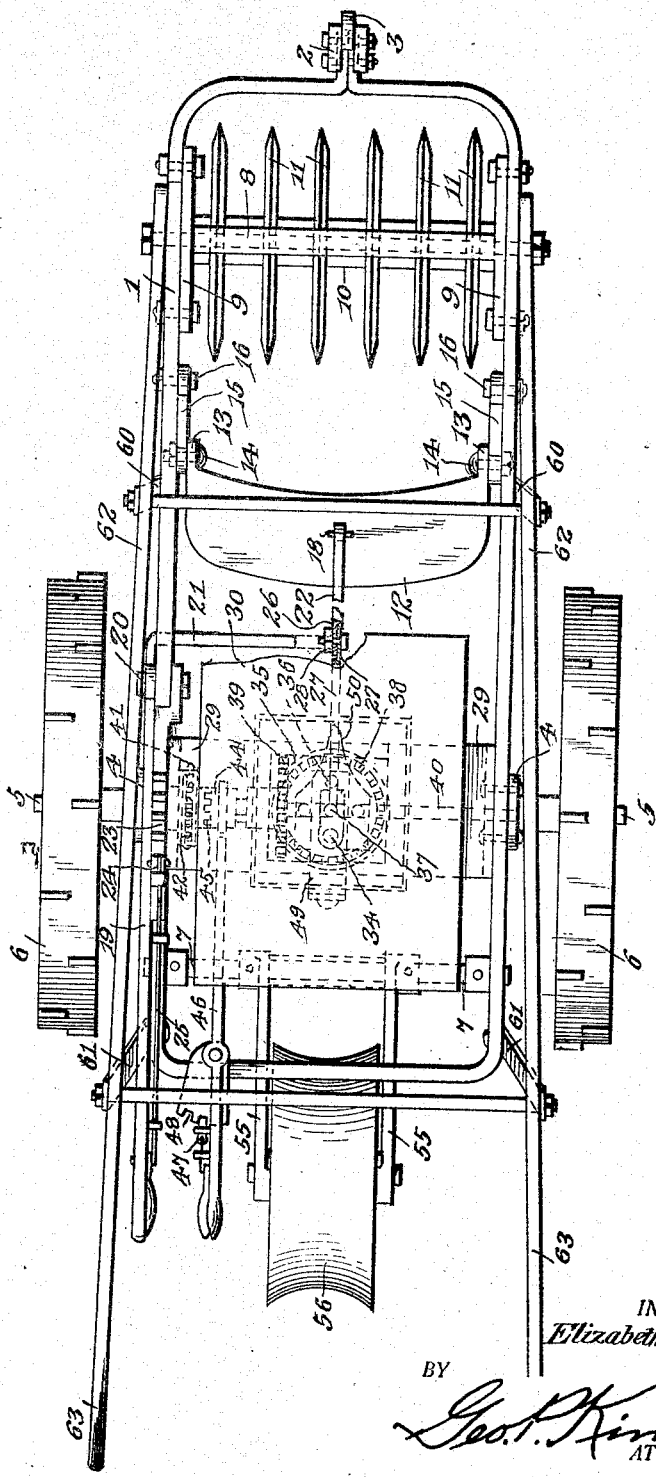

Patented Nov. 24, 1925.

1,563,235

UNITED STATES PATENT OFFICE.

ELIZABETH B. SMITH, OF MARVELL, ARKANSAS.

PLANTER.

Application filed July 26, 1923. Serial No. 653,952.

*To all whom it may concern:*

Be it known that I, ELIZABETH B. SMITH, a citizen of the United States, residing at Marvell, in the county of Phillips and State of Arkansas, have invented certain new and useful Improvements in Planters, of which the following is a specification.

This invention relates to a combined cultivator and planter for agricultural purposes, and has for its object to provide in a manner as hereinafter set forth, means whereby the ground is worked or cut up and then levelled in advance of the forming of the furrow into which the seed is deposited, and further whereby the seed is covered after being deposited in the furrow.

A further object of the invention is to provide an agricultural machine of the class referred to and in a manner as hereinafter set forth, with a ground levelling drag and a drill formed with an adjustable lower section, said drag and said section being connected together whereby when the drag is shifted to inoperative position the said section is carried therewith to be clear of the ground.

Further objects of the invention are to provide an agricultural machine of the class referred to, and in a manner as hereinafter set forth, which is comparatively simple in its construction and arrangement, strong, durable, compact, thoroughly efficient in its use, readily assembled, and comparatively inexpensive to set up.

With the foregoing and other objects in view the invention consists of the novel construction, combination and arrangement of parts, as hereinafter more specifically described and illustrated in the accompanying drawings, wherein is shown an embodiment of the invention, but it is to be understood that changes, variations and modifications can be resorted to, which fall within the scope of the claim hereunto appended.

In the drawings wherein like reference characters denote corresponding parts throughout the several views:—

Figure 1 is a longitudinal sectional view of a combined cultivator and planter in accordance with this invention.

Fig. 2 is a top plan view thereof.

Fig. 3 is a modified form of covering drag.

Referring to the drawings in detail, the body portion of the machine is substantially rectangular in contour, and consists of a frame 1 formed from a bar of any suitable material, or a plurality of bars suitably connected together, and said frame 1 has its front provided with a pair of forwardly extending flanges 2, to which is secured a clevis 3, whereby any suitable means can be coupled with the machine for the purpose of pulling it over the ground.

The frame 1, between the center and rear end thereof, is provided with hangers 4, in which is mounted the axle 5 of the machine, and said axle projects outwardly from each side of the frame 1, and has each end provided with a traction wheel 6. The frame 1, in proximity to its rear end, has a transversely extending brace 7, and in proximity to its front end, has a transversely extending brace 8. Secured to the sides of the frame 1, in proximity to the forward end thereof, is a pair of depending hangers 9, carrying a shaft 10, which is provided with a series of ground working disks 11. The function of the disks 11 is to work or cut up the ground, in advance of the forming of the furrow therein for the reception of the seed. Immediately after the ground has been worked or cut up by the disk 11, it is levelled through the medium of a drag 12, which is arranged rearwardly of the disk 11, but in proximity thereto.

The drag 12 is formed with a pair of forwardly extending flanges 13, which are pivotally connected as at 14, to a pair of hanger rods 15, having their upper ends pivotally connected as at 16, to the sides of the frame 1. The drag 12, centrally of its upper face, has secured a vertically disposed I-bolt 17, having attached thereto a chain 18, which depends from the forward end of a drag adjusting lever 19.

The lever 19, is pivotally mounted intermediate its ends, as at 20, upon the outer face of one side of the frame 1. The lower end 22 of the lever 19 is offset from the upper main portion 23 so as to lie in the longitudinal center of the machine, the intermediate portion 21 extending transversely of the frame at right angles to the upper and lower portions. Secured to that side of the machine frame, with which the lever 19 is pivotally connected, is a rack 23, engageable by a dog 24, operated by a lever member 25, carried by the lever 19, for the purpose of locking the lever 19, in the position to which it has been shifted, or in other words, to prevent the shifting of the lever 19, after it has been set.

At the point of joinder of the intermediate portion 21 with the lower portion 22 a depending lug 26 is arranged to which the upper end of a connecting bar 27 is attached as at 28. The function of the connecting bar 27 will be presently referred to.

Secured to the frame 1, and extending transversely thereof, as well as being positioned above the axle 5, is a supporting plate 29, upon which is mounted a hopper 30.

Fixedly secured to the member 29, and arranged below the discharge opening 21, is a drill consisting of a tubular upper section 49, and a shiftable lower section 50, the latter being pivotally connected as at 51, to the lower end of the section 49. The section 50 is formed with an apertured lug 52, to which is pivotally connected, as at 53, the lower end of the rod 27, and by this arrangement, when the drag 12 is shifted to inoperative position, the section 50 will be carried therewith, so that the said section 50 will be clear of the ground. The section 49 of the drill is connected with the axle 5, by a keeper bracket 54. The section 50 opens the furrow and deposits the seed after the ground has been levelled by the drag 12.

Extending rearwardly from the brace member 7, is a depending yoke 55, carrying a wheel or drag 56, for the purpose of covering the seed with the ground, after the seed has been deposited in the furrow.

In lieu of employing a wheel, similar to 56, to provide for covering up of the seed, a drag 57 as shown in said Fig. 3, can be employed, and which is carried by a pair of hanger arms 58, secured to the frame 1, as at 59.

Connected to the sides of the frame 1, by the uprights 60, 61, is a pair of rearwardly extending and upwardly inclined handle members 62, having their rear ends provided with curved grips 63.

From the foregoing construction and arrangement of parts, an agricultural machine is set up, which will not only work or cut up the ground in advance of the dropping of the seed in the furrow, but after the ground has been worked or cut up, it is levelled and then provided with a furrow, after which the seed is deposited, and then immediately upon the depositing of the seed, the seed is covered through the medium of the drag or wheel, which is arranged rearwardly of the drill tooth, and in view of the foregoing, it is obvious that a machine is set up which expeditiously works, furrows, plants and covers during the travel of the machine over the ground, and although the preferred embodiment of the invention is as described and illustrated, yet it is to be understood that changes in the details of construction can be had which will fall within the light of the invention as claimed.

What I claim is:—

An agricultural machine comprising a rectangular frame, a combined furrow opener and seed conductor member depending therefrom and disposed at the longitudinal center thereof, that part of said member forming the furrow opener being pivoted, an adjustable incline lifting lever pivoted intermediate its ends to one side of said frame and having its lower portion bent at right angles to the main portion and extending transversely across the frame, a lug depending from the end of said transverse portion, and a rod pivotally connected at its upper end to said lug and at its lower end to the pivoted part of said member.

In testimony whereof, I affix my signature hereto.

Mrs. ELIZABETH B. SMITH.